United States Patent [19]

Vegella

[11] 4,053,163
[45] Oct. 11, 1977

[54] SEAL CONSTRUCTION

[76] Inventor: George Vegella, 25150 Thomas Drive, Warren, Mich. 48091

[21] Appl. No.: 692,831

[22] Filed: June 4, 1976

Related U.S. Application Data

[63] Continuation-in-part of Ser. No. 536,681, Dec. 26, 1974, abandoned.

[51] Int. Cl.$^2$ ............................................. F16J 15/18
[52] U.S. Cl. .................................... 277/124; 277/193; 277/205
[58] Field of Search ............... 277/205, 124, 123, 165, 277/180, 193, 199, 212 C

[56] References Cited

U.S. PATENT DOCUMENTS

| | | | |
|---|---|---|---|
| 2,665,151 | 1/1954 | Fisler et al. | 277/124 |
| 2,907,596 | 10/1959 | Maha | 277/188 |
| 3,013,830 | 12/1961 | Milligan | 277/124 |
| 3,447,819 | 6/1969 | Borsum et al. | 277/205 |
| 3,519,280 | 7/1970 | Genz | 277/205 |
| 3,790,179 | 2/1974 | Scannell | 277/205 |
| 3,892,418 | 7/1975 | Felt | 277/212 C |

Primary Examiner—Richard E. Aegerter
Assistant Examiner—L. Footland
Attorney, Agent, or Firm—Reising, Ethington, Barnard, Perry & Brooks

[57] ABSTRACT

A one-piece seal member of elastomeric material having an endless main body portion and a pair of leg portions projecting axially from the main body portion in side-by-side relation. The leg portions each have outer sealing surfaces and inner surfaces, and an endless, unobstructed narrow groove is formed between the leg portions. The groove has side walls that extend axially from a closed base to a normally open end at the juncture between the inner surfaces of the leg portions. The leg portions thus flex toward each other about the base of the groove from an unstressed position when the groove is open to provide relatively low resistance to movement of the sealing surfaces. The legs have an installed position relative to each other when the open end of the groove closes, whereupon the resistance to movement of sealing surfaces toward each other, and hence the sealing pressure exerted thereby, is abruptly increased.

3 Claims, 7 Drawing Figures

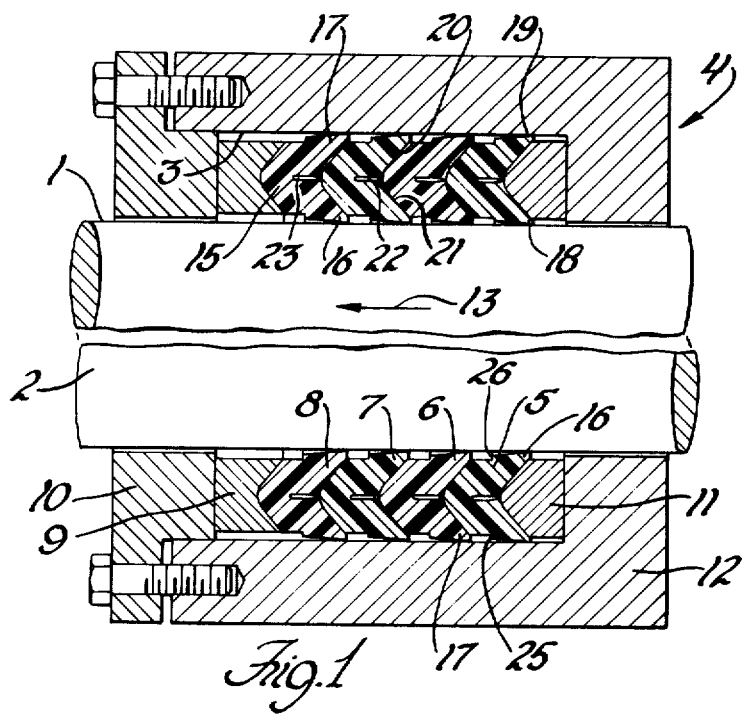
Fig.1
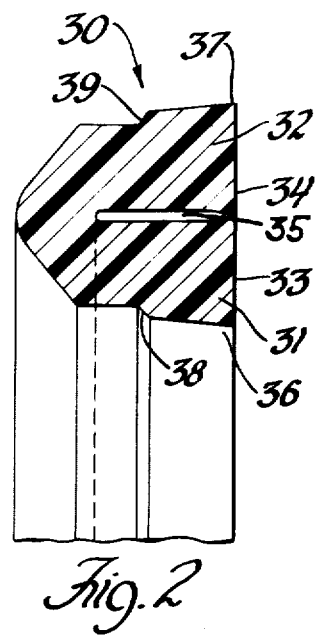
Fig.2
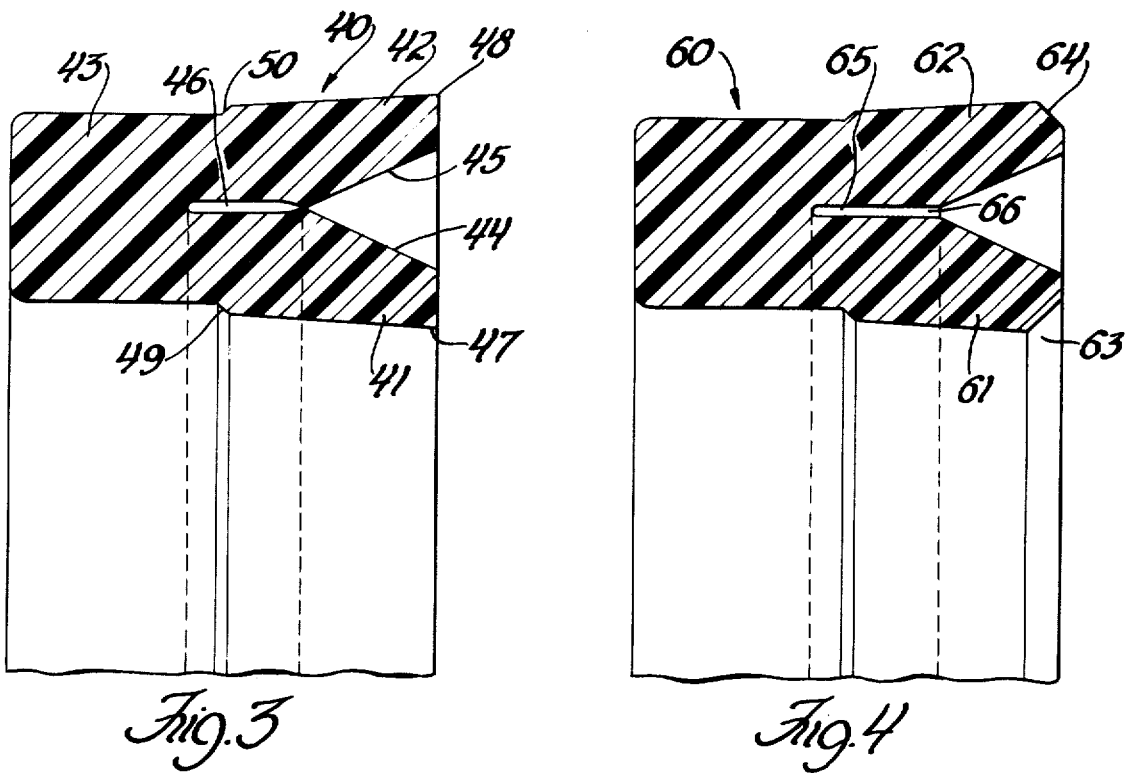
Fig.3
Fig.4

SEAL CONSTRUCTION

This application is a continuation-in-part of my copending application Ser. No. 536,681, now abandoned filed Dec. 26, 1974, the entire disclosure of which is incorporated herein by reference.

BACKGROUND OF THE INVENTION

1. Field of the Invention

This invention relates generally to sealing members of elastomeric material of the type that are used as packings between the annular surfaces of a casing and a reciprocating or rotating shaft.

2. Description of the Prior Art

It is conventional to use a plurality of annular sealing rings of elastomeric material having a generally V-shape in cross section for a packing assembly to form a seal between a shaft and casing in which the shaft is mounted for either reciprocating or rotating movement. Examples of this general type of sealing members and packing assemblies formed thereby are disclosed in U.S. Pat. Nos. 2,665,151; 2,907,596; 2,962,314; 3,013,830; 3,342,500; 3,386,745; 3,447,819; 3,519,280; 3,680,874 and 3,790,179.

As is disclosed in the prior art patents referred to in the preceding paragraph, the sealing members are generally nested together between the end walls of a packing housing. At least on of the end walls of the packing housing is removable, and when installed, can be axially adjusted toward and away from the other end wall so that axial compression can be applied to the nested sealing members. The axial pressure applies forces on the nested sealing members that increase the sealing pressure applied in a radial direction by the sealing members against the surfaces of the shaft and packing housing.

In the unstressed condition of the sealing members, the sealing surfaces are of course spaced apart a distance greater than is the case in the installed condition; the sealing surfaces are moved toward each other in the installed condition in order to apply sealing pressure. For installation purposes, it is of course desirable that the sealing surfaces be easily moved toward each other. Conversely, however, once installed, it is desirable that there be high resistance to movement of the sealing surfaces toward each other so that adequate sealing pressure is applied by the sealing surfaces against the respective surfaces of the shaft and packing housing. Stated another way, it is on the one hand desirable for there to be relatively low resistance to compression of the sealing surfaces toward each other for installation purposes, but on the other hand, it is desirable for there to be high resistance to compression of the sealing surfaces toward each other after the sealing members are installed.

Some prior art sealing members, for example, the sealing members disclosed in the above referred to U.S. Pat. Nos. 2,665,151 and 3,013,830, simply provide for the sealing surfaces to be spaced apart a substantially greater distance in the unstressed condition of the sealing member with respect to the installed condition of the sealing member. This requires that the sealing surfaces be compressed toward each other from the unstressed condition to the spacing required for the installed condition, in which installed condition, substantial pressure is exerted by the sealing surfaces tending to spread the sealing surfaces. This, or course, increases the difficulty of installing the sealing members. Another approach in the prior art, as shown for example in U.S. Pat. Nos. 3,169,776; 3,342,500 and 3,680,874, is to insert a second element such as an O-ring or garter-type spring between the legs of the V-shaped sealing member to increase the stiffness.

SUMMARY OF THE INVENTION

An object of the this invention is to provide a sealing member and packing assembly wherein the sealing member has a pair of legs with sealing surfaces thereon constructed such that the legs have low resistance to compression toward each other in the unstressed condition thereof, but which have high resistance to compression toward each other in the installed condition.

A sealing member according to the present invention is embodied in a molded continuous ring seal of the single element type, i.e., one-piece construction requiring no filler or wedging member for forcing apart the axially extending leg portions to increase the bearing pressure of their sealing lip surfaces. Also, the leg portions need not extend a great distance from the main annular body portion of the ring, and, in fact, for applications wherein relatively high fluid pressures are to be sealed the leg extension is relatively short. For low pressure sealing applications the legs of the instant seal ring are somewhat more extended in length in order to maximize the self sealing action of the low pressure fluid in holding their lip-forming ends fully engaged with the machine surfaces to be sealed, but in neither instance is it necessary for the legs to be molded with more than a relatively moderate amount of flare or divergence in the initial or normal condition, i.e., prior to installation between the machine surfaces to be sealed. As a result, the installation of the seal is facilitated and the likelihood of damaging the seal during installation is minimized.

An important feature of the invention is in the provision of a relatively narrow annular groove formed between the leg portions so as to extend axially toward the main body portion, with its end remote from the main body portion being normally open. This open end of the groove closes upon contraction of the leg portions toward each other during installation, with the result that further such contraction can only be effected by applying a sharply higher rate of compressive force.

In some embodiments of the invention, a step or shoulder molded on the outer peripheral wall of the outer leg and on the inner peripheral wall of the inner leg. These shoulders cooperate with the narrowness of the groove and relative thinness of the leg sections in forcing some compression of the seal material upon installation and thereby ensuring good sealing action under both dynamic and static conditions and over a broad range of fluid pressure applications. As used herein, the term "fluid" includes hydraulic or liquid as well as air or other gases.

Another preferred embodiment of the invention, the seal member includes an endless main body portion with a pair of endless leg portions enclosing the central axis of the body. The leg portions each have outer sealing surfaces and inner surfaces extending from opposite sides of the free ends of the leg portions. A sealing tip projects outwardly from each sealing surface intermediate its ends. An endless narrow groove is formed between the leg portions. The groove has side walls that extend from a closed base at the end of the groove remote from the free ends of the leg portions to a normally open end at the juncture between the inner surfaces of the leg portions. The sealing tips are located between the open end of the groove and the free ends of the leg portions. The leg portions have an unstressed position with respect to each other in which the groove is open such that any movement of the leg portions toward each other from the unstressed position flexes the leg portions about the base of the groove until the open end of the groove is closed. When the open end of the groove is closed any further movement of the leg portions toward each other can only take place by moving the sealing tips about the closed end of the groove. Consequently, there is an abrupt increase in the resistance of movement of the sealing tips toward each other, and hence the sealing pressure exerted thereby, because of the decrease in the moment arm from the unstressed to the installed positions of the leg portions.

Other objects, advantages and features of the invention will become apparent from the following description taken in connection with the accompanying drawings.

DESCRIPTION OF THE DRAWINGS

FIG. 1 is a longitudinal sectional view showing a series of one embodiment of the improved seal, stacked in end-to-end relation, as installed for sealing against fluid leakage between a machine shaft and its supporting housing;

FIG. 2 is an enlarged partial sectional view, similar to FIG. 1 but showing a modified form of the seal per se particularly designed for applications requiring sealing against relatively high fluid pressure;

FIGS. 3 and 4 are similar partial longitudinal sectional views of further modifications of seals particularly suitable for applications requiring sealing against relatively lower fluid pressure but also suitable in high pressure applications;

DESCRIPTION OF THE PREFERRED EMBODIMENTS

Figure 7:
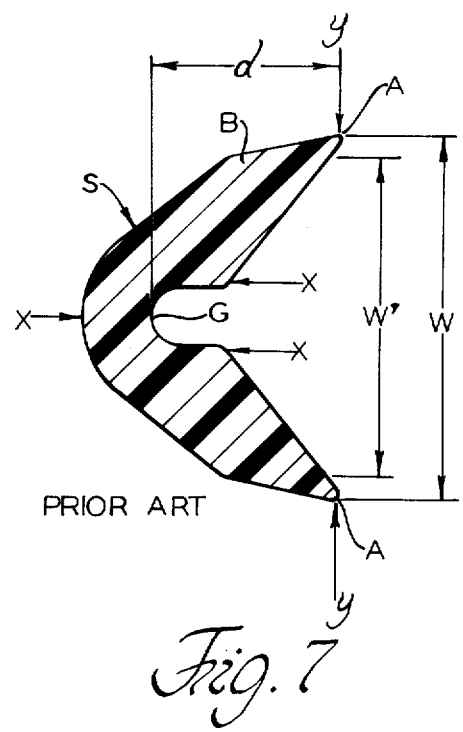
FIG. 7 is a sectional view of a conventional prior art sealing member.

In FIG. 7, a typical prior art sealing member is indicated by reference character S and includes a pair of leg portions B terminating in outer sealing tips A. The leg portions B have outer sealing surfaces defined by a portion of the outer wall depending from the sealing tips A in FIG. 7, and inner surfaces extending inwardly from the respective sealing tips A. The inner surfaces of the legs B terminate at the edges of a groove G formed in the center of the main body of the sealing member S.

In the unstressed condition of the sealing member S in FIG. 7, the sealing tips are spaced apart a width or distance W. When the sealing members S are installed in a packing housing such as illustrated in FIG. 1, the sealing tips A are compressed inwardly toward each other by bending the leg members B about the base of the groove G. The sealing tips A are spaced apart a distance W' when installed in a packing housing. The leg portions B are flexed inwardly about the base of the groove, the moment arm between the sealing tips A and the base of the groove G having a length indicated at $d$ in FIG. 7.

The forces acting on the sealing member S in its installed condition are illustrated by the force vectors $x$ and $y$. When installed, the sealing members S are compressed axially, and forces in the direction of arrows $x$ act as indicated on the sealing member S because of the configuration of the sealing member. The sealing pressure exerted by the sealing tips A are indicated by the arrows or force vectors $y$.

In the prior art sealing member S of FIG. 7, the leg portions B always tend to flex about the base of the groove G since the groove G never closes in the installed condition of of the sealing member S. Thus, in order to install the sealing member S, the sealing tips A must be compressed toward each other from the width W to the width W'. Since the sealing tips A must exert high pressure on the respective walls of the shaft and packing housing, installation of the sealing member S is made difficult by the necessity to compress the sealing tips A toward each other with a substantial amount of pressure.

With reference to FIG. 1, one embodiment of a seal according to the present invention is shown as installed between the outer annular surface 1 of a machine shaft and the inner annular surface 3 of its associated packing housing, which housing is indicated collectively by reference numeral 4. Installed under some radial compression between the housing and shaft surfaces 3 and 1, respectively, are a series of four identical single element (or one piece) seal members 5, 6, 7 and 8 of elastomeric material stacked in end-to-end relation. These seal members are supported against axial displacement relative to the housing by an end spacer ring 9 interposed between the seal ring 8 and a housing end plate 10 and a second spacer ring 11 between the rearmost seal member 5 (or right-hand ring as viewed in FIG. 1) and an end wall 12 of the housing. The four seals 5, 6, 7 and 8 in FIG. 1 prevent leakage flow (particularly in the direction of the arrow 13) of air or hydraulic fluid under pressure between the shaft and housing surfaces 1 and 3, and each comprises a main body portion 15 having inner and outer axially extending leg portions 16 and 17 molded integrally therewith. The inner leg portions 16 engage the shaft surface 1, while the outer leg portions 17 engage the housing surface 3. Leg portions 16 and 17, although extending generally axially with respect to shaft 2, diverge radially from each other. The amount of this divergence in the normal condition of the ring, i.e., in its free state, prior to installation, is somewhat greater than that shown in FIG. 1, and the resiliency of the material of the members 5–8 is such that their leg portions 16 and 17 may be flexed radially toward each other a sufficient extent to permit insertion of the rings between the surfaces 1 and 3 prior to assembly of the spacer 9 and housing end plate 10. In the installed condition each leg portion 16 and 17 of the ring thus tends to expand radially against its respective surfaces 1 and 3, with those portions 18 and 19 of the leg internal and external peripheries adjacent the extended ends of the legs forming lip-like sealing edges.

A relatively narrow annular axially extending groove 22 is formed in the main body portion 15 midway between the leg portions 16 and 17. Groove 22 has a base 23 at its end remote from the sealing edges 18 and 19. In the unstressed or free state of the seal member prior to installation, groove 22 is open at its end remote from the main body portion 15 at the juncture between the opposed inner surfaces 20 and 21 of the leg portions 16 and 17. The opposed side walls of the groove 22, in the open condition of the groove 22, are in effect extensions of the respective inner surfaces 20 and 21 of the leg portions 16 and 17. However, during insertion of the seal members between the surfaces 1 and 3, the extended ends of the leg portions 16 and 17 flex toward each other about the base 23 until the open end of groove 22 closed. Thereafter, with continued such flexure of the leg portions 16 and 17 to equate the radial distance between the sealing edges 18 and 19 of the leg portions to the annular spacing of the machine surfaces 1 and 3 from each other, the leg portions 16 and 17 must flex about the closed end of the groove 22, the main body portion 15 being in essence a solid member throughout with groove 22 closed.

The resistance to movement of the sealing edges 18 and 19 of the leg portions, and hence the sealing pressure exerted by edges 18 and 19, increases abruptly when the open end of groove 22 closes for the reason that the side walls of the groove 22 function as continuations of the leg portions until the groove closes, but not after the groove closes. Hence, when the groove is open, leg portions 16 and 17 bend or flex about the base 23, but when the groove closes any subsequent bending must be approximately about the junction between surfaces 20 and 21 of the leg portions. Such subsequent bending therefore is resisted with a correspondingly higher reactive force exerted by the lip-like sealing edges 18 and 19. The width of the groove 22 is such that it closes upon installation. Consequently, although the leg portions are highly flexible when the groove 22 is open to permit easy installation of the seal members, the sealing pressure is high because of the increased stiffness caused by the closing of groove 22 on installation.

The force required to flex the leg portions 16 and 17 radially toward each other, and hence the sealing pressure applied by the sealing edges 18, 19 against the surfaces 1 and 3, is also dependent on the configuration of the leg portions as well as the location of the sealing edges thereof with respect to the open end of the groove 22. As shown in FIG. 1, the inwardly facing surfaces 20 and 21 of the leg portions adjacent the groove 22 diverge outwardly from each other toward the extended ends of the legs to form a generally conical shaped cavity, and the opposite facing end of the main body portion 15 of each ring has a corresponding conical shape so as to be nestably received between the leg portions of the next rearwardly adjacent ring. Similarly, the spacers 9 and 11 have their opposing end faces similarly shaped to nestably abut the legs of the seal member 5 and nestably receive the main body portion of the seal member 8, respectively. Radially inward and outward sealing pressure of the sealing edges 18 and 19 of each seal member against the shaft and housing surfaces 1, 3 resulting from the radial compaction of the leg portions from their unstressed condition is augmented by the pressure applied against the inwardly facing surfaces 20 and 21 of the leg portions.

Shoulders 25 and 26 are formed on the outer and inner peripheries of leg portions 16 and 17, respectively, and are located in a plane axially intermediate the ends of the groove 22 of each of the seal members 5–8, and serve to further control flexure of the leg portions. The configuration of the peripheral side walls of the leg portions provided by the shoulders 25 and 26 also tends to increase the axial length of the area in sealing contact with surfaces 1 and 3.

A second embodiment of the invention is shown in FIG. 2 wherein reference numeral 30 collectively designates a sealing member having a configuration particularly adapted for high pressure hydraulic installations, in which the ends of the inner and outer leg portions terminate in generally radially extending surfaces 33 and 34, respectively. The sealing member is shown in the same radially compressed condition as the rings 5–8 previously described, i.e., with the legs 31, 32 flexed toward each other, with the normally open end of the groove 35 being closed. Since the lip-like sealing edges 36, 37 of this ring are substantially radially opposite the closed end of the groove, the resistance to such flexure of the legs is considerably greater than in the case of the previously described rings 5–8, and hence the sealing force of the lips against the confining machine surfaces (not shown) is likewise much higher. Accordingly, the ring 30 is intended for sealing against much higher fluid pressures. As in the case of the embodiment shown in FIG. 1, however, the rearwardly facing shoulders 38, 39 of the legs 31, 32 serve to control flexure of the leg portions, after closure of the groove 35, primarily to the portions of the legs which extend beyond the shoulders. The configuration provided by shoulders 38 and 39 also tends to increase the axial length of the area in sealing contact with the surfaces 1 and 3.

FIG. 3 illustrated another embodiment of this invention which is particularly adapted for relatively low pressure installations. Reference numeral 40 collectively designates a seal ring, or member, having a pair of axially extending leg portions 41 and 42. The leg portions 41 and 42 have a substantially greater extension from the main body portion 43 of the ring, and the radially facing surfaces 44, 45 of the legs have a smaller angle of divergence from each other than in the case of the rings 5–8 of FIG. 1. Also the axial extent of the inwardly facing surfaces 44, 45 beyond the groove 46 is substantially greater, all of which factors serve to make the ring more responsive to pressure of the fluid being sealed in forcing the lip-like sealing edges 47, 48 radially inward and outward against the coacting machine surfaces (not shown). As in the previously described embodiments, the sealing member 40 is shown with the legs 41, 42 compressed radially toward each other to their positions occupied with the ring in its installed condition. During such flexure from the pre-installed or free-state condition, the normally open end of the groove 46 closes, following which continued flexure of the legs toward each other is confined to the portions thereof extending beyond from the shoulders 49, 50.

In the embodiment of FIG. 4, the sealing member 60 and the inner and outer legs 61, 62 have their extended ends chamfered as at 63, 64. The sealing member 60 is shown in FIG. 4 in its normal or free-state condition, i.e., prior to installation. Thus, the groove 65 remains open at its end 66, since the legs 61, 62 have not been flexed radially toward each other to close the same.

Figure 5:
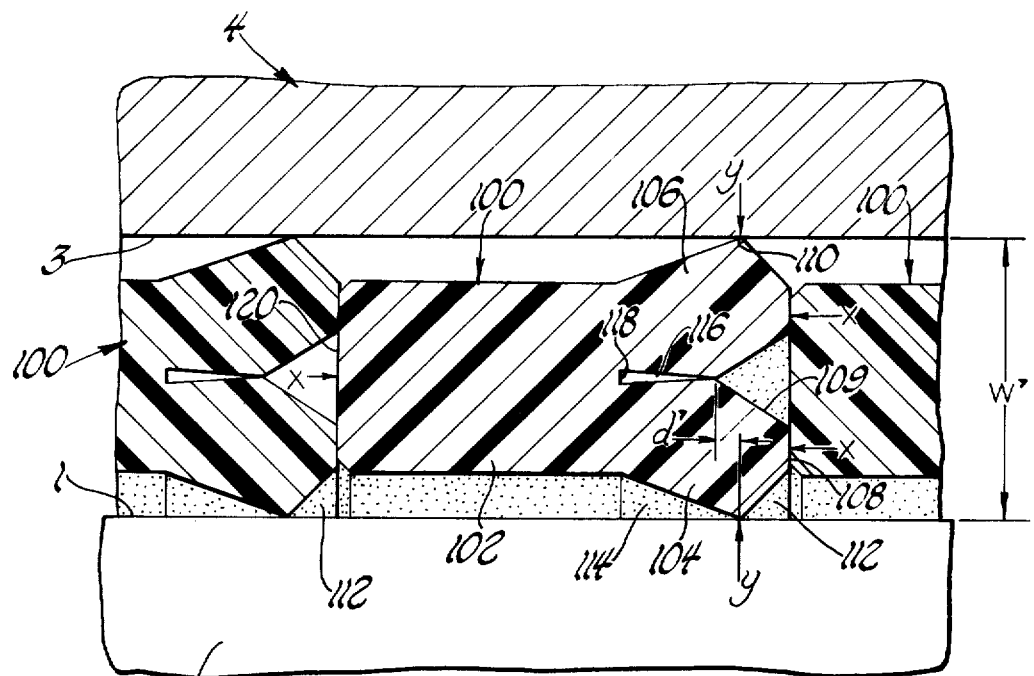
FIG. 5 is an enlarged fragmentary view illustrating another preferred embodiment of sealing members in a packing assembly similar to that shown in FIG. 1.
Figure 6:
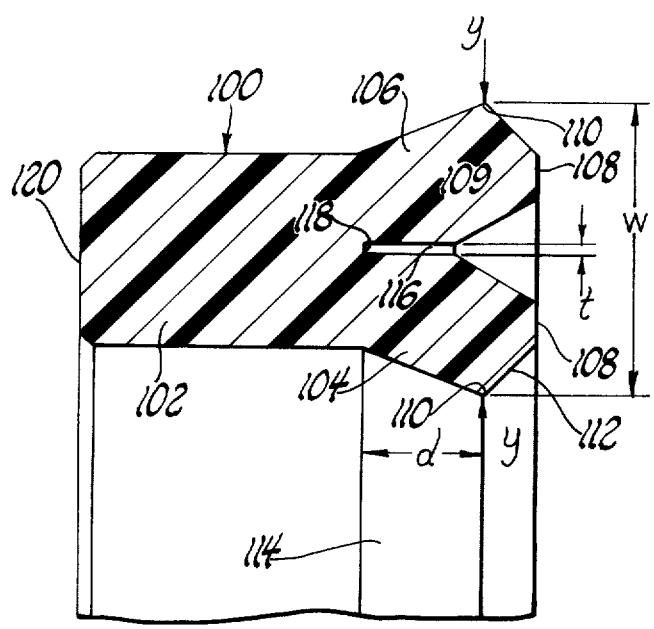
FIG. 6 is a view similar to FIG. 4 of one of the sealing members of the assembly of FIG. 5.

In FIGS. 5 and 6, reference numeral 100 collectively designates a one piece sealing member having an endless main body portion 102. A pair of endless leg portions 104 and 106 project integrally from the main body portion in side-by-side relation to free the end portions 106. The free end portions 106 have flat, transverse surfaces with respect to the central axis of the sealing member 100. The leg portions 104 are formed with outer sealing surfaces extending from the outer edges of the respective free end portions 108, and inner surfaces 109. The outer sealing surfaces each includes a first inclined portion 112 extending outwardly from the outer edge of the respective free end portion 108 to an outwardly projecting sealing tip 110 intermediate the ends of the sealing surface. A second inclined portion 114 of the outer sealing surface extends from the sealing tip 110 inwardly to the associated side wall of the main body 102.

An endless narrow groove 116 is formed between the leg portions 104 and 106 and also encloses the central axis of the body 102. The groove 116 has side walls extending from a closed base 118 at the end of the groove remote from the free ends 108 of the leg portions to a normally open end at the juncture between the inner surfaces 109 of the leg portions. As is apparent from FIGS. 5 and 6, the sealing tips 110 are located in the direction of the central axis of the body 102 between the normally open end of the grove 116 and the free ends 108 of the leg portions 104, 106.

The groove 116 has substantially parallel side walls and is unobstructed throughout its length between its side walls to permit complete closure of the normally open end of the groove throughout its length.

The sealing member 100 is illustrated in its unstressed condition in FIG. 6. In the unstressed condition, the sealing tips 110 are spaced apart a distance W. In FIG. 5, the sealing member 100 is illustrated in its installed condition, and the sealing tips 110 are spaced apart a distance W'. In order to compress the sealing tips 110 toward each other from the unstressed condition shown in FIG. 6 to the installed condition shown in FIG. 5, the leg portions 104, 106 are flexed about the base 118 of the groove 116. The moment arm about which the leg portions 104, 106 are flexed in the unstressed condition has a length $d$ as illustrated in FIG. 6. The length $d$ is the distance between the sealing tips 110 and the base 118 of the groove 116. When the open end of groove 116 is closed in the installed condition of the sealing member 100, any further compression of the sealing tips 110 toward each other must take place about the juncture between the inner surfaces 109. The moment arm has a length indicated at $d'$ in FIG. 6 which is the distance from the juncture between the inner surfaces 109 at the normally open end of the groove 116 to the sealing tips 110 in the direction of the central axis of the member 100. Thus, the shorter moment arm $d'$ in the installed condition causes an abrupt increase in the resistance of the movement of the sealing tips 110 of the leg portions 104, 106 toward each other.

Thus, the leg portions 104 and 106 of the sealing member 100 have an unstressed position with respect to each other in which the groove 116 is open such that any movement of the leg portions toward each other from the unstressed position, such as by forces applied on the sealing tips, flexes the leg portions 104, 106 about the base 118 of the groove 116 to provide relatively low resistance to movement of the sealing tips 110 toward each other because of the relatively long moment arm $d$ between the sealing tips 110 and the base 118 of the groove. The leg portions 104, 106 have an installed position with respect to each other in which the normally open end of the groove 116 is closed such that any further movement of the leg portions 104, 106 toward each other, such as by forces applied on the sealing tips 110, can only take place about the closed, normally open end of the groove 116 at the juncture between the inner surfaces 109 to provide higher resistance to movement of the sealing tips 110 toward each other because of the shorter moment arm $d'$ between the sealing tips 110 and the juncture of the inner surfaces 109. Thus, the resistance to movement of the sealing tips toward each other, and hence the sealing pressure exerted thereby, abruptly increases when the leg portions 104, 106 are flexed from the unstressed to the installed positions with respect to each other.

When the sealing members 100 are assembled in a packing housing in stacked relationship, the flat transverse end surface 120 of one sealing member seats on the flat transverse end portions 108 of the free ends of another sealing member. When the assembly of sealing members is compressed between the end walls 10 and 12 of the packing housing (FIG. 1), the axial compressive forces in the direction of the central axis of the sealing members is indicated by arrows $x$ in FIG. 5. These axial compressive forces $x$ tend to increase the sealing forces indicated by arrows $y$ in FIG. 5 by compressing the leg portions 104 and 106. The compression of the leg portions 104 and 106, with the groove 116 closed, tends to cause the sealing tips 110 to move apart with respect to each other, and hence increases the sealing pressure on the respective surfaces 1 and 3 because of the configuration of the sealing members 100.

Each of the embodiments has sealing tips or surfaces on the respective leg portions that move toward each other with relatively low resistance when the groove is open in the unstressed condition of the sealing member. In the unstressed condition, the leg portions, and hence the sealing tips move toward each other about the base of the groove. When the groove closes, the moment arm abruptly decreases to correspondingly increase the resistance to movement of the sealing tips toward each other, and hence the sealing pressure exerted thereby. Thus, the sealing efficiency, and ease of installation is substantially improved over the prior art.

While several specific forms of the invention are described in the foregoing specification and illustrated in the accompanying drawings, it should be understood that the invention is not limited to the exact construction shown. Variations and alterations in the construction and arrangement of parts, all falling within the scope and spirit of the invention will be apparent to those skilled in the art.

The embodiments of the present invention in which an exclusive property or privilege is claimed are defined as follows:

1. A one piece seal member of elastomeric material comprising: an endless main body portion; a pair of endless leg portions enclosing the central axis of said body, said leg portions projecting integrally from said main body portion in side by side relation to free end portions; said leg portions each having an outer sealing portion including an outwardly projecting apex portion defined at the intersection of two flat surfaces disposed at an angle with respect to each other, said apex portion defining a sealing tip; and said leg portions each having inner substantially flat inclined surfaces extending from the side of said respective free ends opposite said apex portions; an endless narrow groove formed between said leg portions and enclosing the central axis of said body; said groove having side walls extending from a closed base at the end of said groove remote from the free ends of said leg portions to a normally open end at the juncture between the inner surfaces of said leg portions; said sealing tips each being located in the direction of the central axis of said body between the normally open end of said groove and the free ends of said leg portions; said groove having substantially parallel side walls, said groove being unobstructed throughout its length between the side walls thereof to permit complete closure of said normally open end throughout its length; said leg portions having an unstressed position with respect to each other in which said groove is open such that any movement of said leg portions toward each other from said unstressed position such as by forces applied on said sealing tips flexes said leg portions about the base of said groove to provide relatively low resistance to movement of said sealing tips toward each other because of the relatively long moment arm between said sealing tips and the base of said groove; said leg portions having an installed position with respect to each other in which the open end of said groove is closed such that any further movement of said leg portions toward each other such as by forces applied on said sealing tips can only take place about the closed end of said groove at the juncture between said inner surfaces to provide higher resistance to movement of said sealing tips toward each other because of the shorter moment arm between said sealing tips and the juncture of said inner surfaces at the closed end of said groove such that resistance to movement of said sealing tips toward each other, and hence the sealing pressure exerted thereby, abruptly increases when said leg portions are flexed from the unstressed to the installed positions with respect to each other.

2. A one piece seal member of elastomeric material comprising: an endless main body portion having a pair of substantially flat, parallel side walls; a pair of endless leg portions enclosing the central axis of said body, said leg portions projecting integrally from said main body portion in side by side relation to free end portions; said free end portions having flat, transverse surfaces with inner and outer edges; said leg portions each having an outer sealing portion including first and second substantially flat outer inclined surfaces extending respectively from the outer edge of the flat surface of the free end portion and associated side wall of the respective leg portion to an apex portion at the juncture of said first and second outer inclined surfaces, said apex portion defining a sealing tip; and said leg portions each having inner inclined surfaces extending from the inner edges of the flat surfaces of said respective free ends; an endless narrow groove formed between said leg portions and enclosing the central axis of said body; said groove having side walls extending from a closed base at the end of said groove remote from the free ends of said leg portions to a normally open end at the juncture between the inner inclined surfaces of said leg portions; said inner surfaces converging toward each other to said juncture from said respective free end portion; said sealing tips each being located in the direction of the central axis of said body between the normally open end of said groove and the free ends of said leg portions; said groove having substantially parallel side walls, said groove being unobstructed throughout its length between the side walls thereof to permit complete closure of said normally open end throughout its length; said leg portions having an unstressed position with respect to each other in which said groove is open such that any movement of said leg portions toward each other from said unstressed position such as by forces applied on said sealing tips flexes said leg portions about the base of said groove to provide relatively low resistance to movement of said sealing tips toward each other because of the relatively long moment arm between said sealing tips and the base of said groove; said leg portions having an installed position with respect to each other in which the open end of said groove is closed such that any further movement of said leg portions toward each other such as by forces applied on said sealing tips can only take place about the closed end of said groove at the juncture between said inner surfaces to provide higher resistance to movement of said sealing tips toward each other because of the shorter moment arm between said sealing tips and the juncture of said inner surfaces at the closed end of said groove such that resistance to movement of said sealing tips toward each other, and hence the sealing pressure exerted thereby abruptly increases when said leg portions are flexed from the unstressed to the installed positions with respect to each other; said body having a flat transverse end surface adapted to be seated on the flat transverse surfaces of the free end portions of a seal member of the same construction when a plurality of such seal members are mounted in stacked relationship in a packing assembly.

3. A shaft and packing housing assembly comprising: a packing housing having an end wall and an open end closed by an annular end plate adjustable axially toward and away from said end wall; a shaft received in said packing housing; and a plurality of sealing members received in said housing between said end wall and end plate in sealing engagement with the outer surface of said shaft and the inner surface of said packing housing; each of said sealing members comprising: an endless main body portion having a pair of substantially flat, parallel side walls; a pair of endless leg portions enclosing the central axis of said body, said leg portions projecting integrally from said main body portion in side by side relation to free end portions; said free end portions having flat, transverse surfaces with inner and outer edges; said leg portions each having an outer sealing portion including first and second substantially flat outer inclined surfaces extending respectively from the outer edge of the flat surface of the free end portion and associated side wall of the respective leg portion to an apex portion at the juncture of said first and second outer inclined surfaces, said apex portion defining a sealing tip; and said leg portions each having inner inclined surfaces extending from the inner edges of the flat surfaces of said respective free ends; an endless narrow groove formed betwen said leg portions and enclosing the central axis of said body; said groove having side walls extending from a closed base at the end of said groove remote from the free ends of said leg portions to a normally open end at the juncture between the inner inclined surfaces of said leg portions; said inner surfaces converging toward each other to said juncture from said respective free end portion; said sealing tips each being located in the direction of the central axis of said body between the normally open end of said groove and the free ends of said leg portions; said groove having substantially parallel side walls, said groove being unobstructed throughout its length between the side walls thereof to permit complete closure of said normally open end throughout its length; said leg portions having an unstressed position with respect to each other in which said groove is open such that any movement of said leg portins toward each other from said unstressed position such as by forces applied on said sealing tips flexes said leg portions about the base of said groove to provide relatively low resistance to movement of said sealing tips toward each other because of the relatively long moment arm between said sealing tips and the base of said groove; said leg portions having an installed position with respect to each other in which the open end of said groove is closed such that any further movement of said leg portions toward each other such as by forces applied on said sealing tips can only take place about the closed end of said groove at the juncture between said inner surfaces to provide higher resistance to movement of said sealing tips toward each other because of the shorter moment arm between said sealing tips and the juncture of said inner surfaces at the closed end of said groove such that resistance to movement of said sealing tips toward each other, and hence the sealing pressure exerted thereby abruptly increases when said leg portions are flexed from the unstressed to the installed positions with respect to each other; said body having a flat transverse end surface; said sealing members being stacked in said packing housing with the transverse end surface of one sealing member seated on the flat transverse surfaces of the free end portions of an adjacent seal member such that movement of said end plate toward said end wall compresses said sealing members and increases the sealing pressure exerted by said sealing tips.

* * * * *